(12) United States Patent
Madnani et al.

(10) Patent No.: US 8,301,853 B1
(45) Date of Patent: Oct. 30, 2012

(54) SYSTEM AND METHOD FOR ASYNCHRONOUSLY MIRRORING DATA

(75) Inventors: Kiran Madnani, Framingham, MA (US); Roy E. Clark, Hopkinton, MA (US); Randall H. Shain, Wrentham, MA (US)

(73) Assignee: EMC Corporation, Hopkinton, MA (US)

( * ) Notice: Subject to any disclaimer, the term of this patent is extended or adjusted under 35 U.S.C. 154(b) by 727 days.

(21) Appl. No.: 11/967,836

(22) Filed: Dec. 31, 2007

(51) Int. Cl.
*G06F 12/00* (2006.01)
*G06F 13/00* (2006.01)
*G06F 13/28* (2006.01)

(52) U.S. Cl. ......................................... 711/162
(58) Field of Classification Search .................. None
See application file for complete search history.

(56) References Cited

U.S. PATENT DOCUMENTS

| | | | | |
|---|---|---|---|---|
| 5,909,540 A * | 6/1999 | Carter et al. | .................. | 714/4.4 |
| 5,937,414 A * | 8/1999 | Souder et al. | .................. | 707/616 |
| 6,834,326 B1 * | 12/2004 | Wang et al. | .................. | 711/114 |
| 2005/0251633 A1 * | 11/2005 | Micka et al. | .................. | 711/162 |
| 2005/0256972 A1 * | 11/2005 | Cochran et al. | .................. | 709/245 |

OTHER PUBLICATIONS

S. Deering, Host Extensions for IP Multicasting (RFC 1112), Aug. 1989, Network Working Group.*

* cited by examiner

*Primary Examiner* — Kevin Ellis
*Assistant Examiner* — Gary W Cygiel
(74) *Attorney, Agent, or Firm* — Holland & Knight LLP; Brian J. Colandreo, Esq.; Mark H. Whittenberger, Esq.

(57) ABSTRACT

A method and computer program product for a multicast data mirroring method including defining a multicast group within a local area network. The multicast group includes a first synchronous storage target and one or more asynchronous storage targets. The synchronous storage target is a member of a synchronously-mirrored storage group including at least a second synchronous storage target and a storage initiator device. A write request for storing a data segment within the synchronously-mirrored storage group is received on the storage initiator device. The data segment is written to the first synchronous storage target and the second synchronous storage target. The data segment is multicast to the asynchronous storage targets included within the multicast group.

16 Claims, 3 Drawing Sheets

10

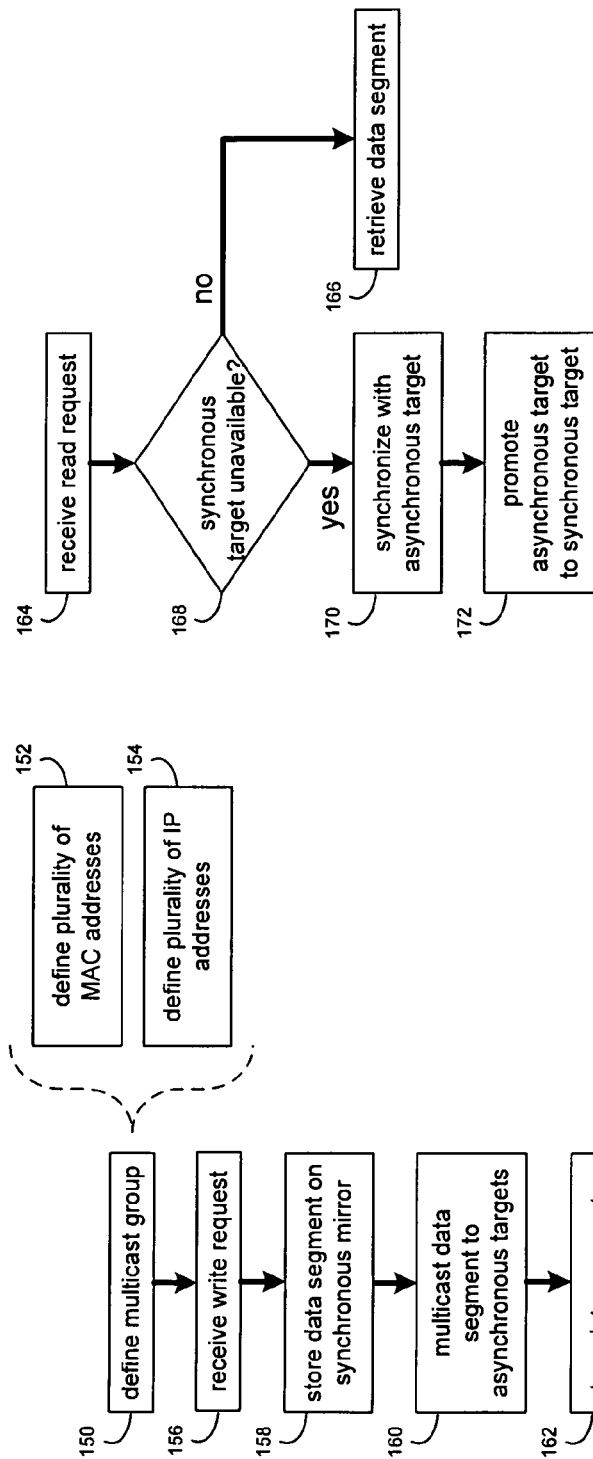

SYSTEM AND METHOD FOR ASYNCHRONOUSLY MIRRORING DATA

TECHNICAL FIELD

This disclosure relates to storage networks and, more particularly, to multicast asynchronous storage networks.

BACKGROUND

Storing and safeguarding electronic data is of paramount importance in modern business. Accordingly, various systems may be employed to protect such electronic data.

For example, disk arrays may be employed that contain multiple storage devices. Disk arrays may provide some level of redundancy by use of mirrored or redundant components (e.g., disk drives, disk controllers, power supplies and/or fans), each of which may be hot-swappable to avoid downtime.

Disk arrays may fall into a plurality of categories, such as Network Attached Storage (NAS) and Storage Area Networks (SAN). An NAS may be a stand-alone, network-accessible, hard disk storage system that may provide file-level access to electronic data. A SAN array may be a dedicated storage system that may connect numerous storage resources to one or many servers. A SAN may provide block-level access to electronic data through one or more SCSI-based protocols (e.g., Fiber Channel and iSCSI).

SUMMARY OF DISCLOSURE

In a first implementation, a multicast data mirroring method includes defining a multicast group within a local area network. The multicast group includes a first synchronous storage target and one or more asynchronous storage targets. The synchronous storage target is a member of a synchronously-mirrored storage group including at least a second synchronous storage target and a storage initiator device. A write request for storing a data segment within the synchronously-mirrored storage group is received on the storage initiator device. The data segment is stored on the first synchronous storage target and the second synchronous storage target. The data segment is multicast to the asynchronous storage targets included within the multicast group.

One or more of the following features may be included. The data segment may be stored on each of the asynchronous storage targets included within the multicast group. Defining the multicast group may include one or more of: defining a group of IP addresses to be addressable as a whole by a single multicast IP address; and defining a group of MAC addresses to be addressable as a whole by a single multicast IP address. At least one of the synchronous storage targets and/or the asynchronous storage targets may be chosen from the group consisting of: a hard drive; a RAID array of hard drives; a computing device including one or more hard drives; and a Storage Area Network.

In another implementation, a computer program product resides on a computer readable medium that has a plurality of instructions stored on it. When executed by a processor, the instructions cause the processor to perform operations including defining a multicast group within a local area network. The multicast group includes a first synchronous storage target and one or more asynchronous storage targets. The synchronous storage target is a member of a synchronously-mirrored storage group including at least a second synchronous storage target and a storage initiator device. A write request for storing a data segment within the synchronously-mirrored storage group is received on the storage initiator device. The data segment is stored on the first synchronous storage target and the second synchronous storage target. The data segment is multicast to the asynchronous storage targets included within the multicast group.

One or more of the following features may be included. The data segment may be stored on each of the asynchronous storage targets included within the multicast group. Defining the multicast group may include one or more of: defining a group of IP addresses to be addressable as a whole by a single multicast IP address; and defining a group of MAC addresses to be addressable as a whole by a single multicast IP address. At least one of the synchronous storage targets and/or the asynchronous storage targets may be chosen from the group consisting of: a hard drive; a RAID array of hard drives; a computing device including one or more hard drives; and a Storage Area Network.

In another implementation, a multicast data mirroring method includes defining a multicast group within a local area network. The multicast group includes a first synchronous storage target and one or more asynchronous storage targets. The synchronous storage target is a member of a synchronously-mirrored storage group including at least a second synchronous storage target and a storage initiator device. In the event that the first synchronous storage target or the at least a second synchronous storage target becomes unavailable, the available synchronous storage target may be synchronized with a selected asynchronous storage target chosen from the one or more asynchronous storage targets.

One or more of the following features may be included. Defining the multicast group may include one or more of: defining a group of IP addresses to be addressable as a whole by a single multicast IP address; and defining a group of MAC addresses to be addressable as a whole by a single multicast IP address. At least one of the plurality of storage targets may be chosen from the group consisting of: a hard drive; a RAID array of hard drives; a computing device including one or more hard drives; and a Storage Area Network.

A read request for reading a data segment from the synchronously-mirrored storage group may be received on the storage initiator device. The data segment may be retrieved from one or more of the synchronous storage targets. The selected asynchronous storage target may be promoted to the synchronously-mirrored storage group. The first synchronous storage target, the at least a second synchronous storage target and the storage initiator device may be coupled using a first network infrastructure. The first synchronous storage target and the one or more asynchronous storage targets may be coupled using a second network infrastructure.

In another implementation, a computer program product resides on a computer readable medium that has a plurality of instructions stored on it. When executed by a processor, the instructions cause the processor to perform operations including defining a multicast group within a local area network. The multicast group includes a first synchronous storage target and one or more asynchronous storage targets. The synchronous storage target is a member of a synchronously-mirrored storage group including at least a second synchronous storage target and a storage initiator device. In the event that the first synchronous storage target or the at least a second synchronous storage target becomes unavailable, the available synchronous storage target may be synchronized with a selected asynchronous storage target chosen from the one or more asynchronous storage targets.

One or more of the following features may be included. Defining the multicast group may include one or more of: defining a group of IP addresses to be addressable as a whole by a single multicast IP address; and defining a group of MAC addresses to be addressable as a whole by a single multicast IP address. At least one of the plurality of storage targets may be chosen from the group consisting of: a hard drive; a RAID array of hard drives; a computing device including one or more hard drives; and a Storage Area Network.

A read request for reading a data segment from the synchronously-mirrored storage group may be received on the storage initiator device. The data segment may be retrieved from one or more of the synchronous storage targets. The selected asynchronous storage target may be promoted to the synchronously-mirrored storage group. The first synchronous storage target, the at least a second synchronous storage target and the storage initiator device may be coupled using a first network infrastructure. The first synchronous storage target and the one or more asynchronous storage targets may be coupled using a second network infrastructure.

The details of one or more implementations are set forth in the accompanying drawings and the description below. Other features and advantages will become apparent from the description, the drawings, and the claims.

BRIEF DESCRIPTION OF THE DRAWINGS

FIG. 3 is a flowchart of a data write process executed by the data mirroring process of FIG. 1; and FIG. 4 is a flowchart of a data read process executed by the data mirroring process of FIG. 1.

Like reference symbols in the various drawings indicate like elements.

DETAILED DESCRIPTION OF THE PREFERRED EMBODIMENTS

System Overview

Figure 1:
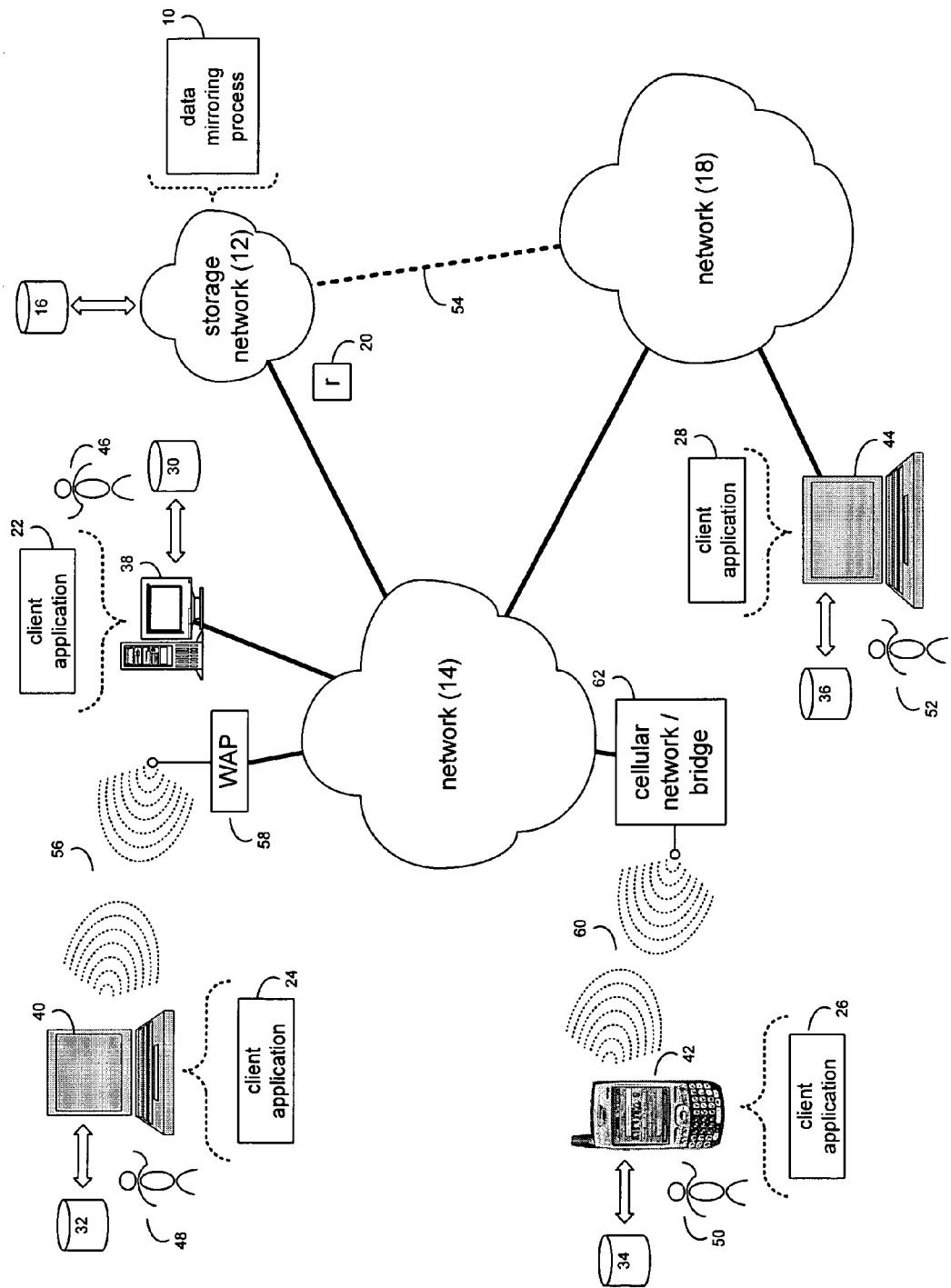
FIG. 1 is a diagrammatic view of a storage network and a data mirroring process coupled to a distributed computing network.

Referring to FIG. 1, there is shown data mirroring process 10 that may reside on and may be executed by storage network 12, which may be connected to network 14 (e.g., the Internet or a local area network). Examples of storage network 12 may include, but are not limited to: a Network Attached Storage (NAS) system and a Storage Area Network (SAN). As will be discussed below in greater detail, a SAN may include one or more of a personal computer, a server computer, a series of server computers, a mini computer, a mainframe computer, a RAID array and an NAS. The various components of storage network 12 may execute one or more operating systems, examples of which may include but are not limited to: Microsoft Windows XP Server™; Novell Netware™; Redhat Linux™, Unix, or a custom operating system, for example.

As will be discussed below in greater detail, data mirroring process 10 may define a multicast group within a local area network. The multicast group may include a first synchronous storage target and one or more asynchronous storage targets. The synchronous storage target may be a member of a synchronously-mirrored storage group including at least a second synchronous storage target and a storage initiator device.

A write request for storing a data segment within the synchronously-mirrored storage group may be received on the storage initiator device. The data segment may be written to the first synchronous storage target and the second synchronous storage target. The data segment may be multicast to the asynchronous storage targets included within the multicast group.

In the event that the first synchronous storage target or the at least a second synchronous storage target becomes unavailable, the available synchronous storage target may be synchronized with a selected asynchronous storage target chosen from the one or more asynchronous storage targets.

The instruction sets and subroutines of data mirroring process 10, which may be stored on storage device 16 included within storage network 12, may be executed by one or more processors (not shown) and one or more memory architectures (not shown) included within storage network 12. Storage device 16 may include but is not limited to: a hard disk drive; a tape drive; an optical drive; a RAID array; a random access memory (RAM); and a read-only memory (ROM).

Network 14 may be connected to one or more secondary networks (e.g., network 18), examples of which may include but are not limited to: a local area network; a wide area network; or an intranet, for example.

Various data requests (e.g. data request 20) may be sent from client applications 22, 24, 26, 28 to storage network 12. Examples of data request 20 may include but are not limited to data write requests (i.e. a request that a data segment be written to storage network 12) and data read requests (i.e. a request that a data segment be read from storage network 12).

The instruction sets and subroutines of client applications 22, 24, 26, 28, which may be stored on storage devices 30, 32, 34, 36 (respectively) coupled to client electronic devices 38, 40, 42, 44 (respectively), may be executed by one or more processors (not shown) and one or more memory architectures (not shown) incorporated into client electronic devices 38, 40, 42, 44 (respectively). Storage devices 30, 32, 34, 36 may include but are not limited to: hard disk drives; tape drives; optical drives; RAID arrays; random access memories (RAM); read-only memories (ROM), and all forms of flash memory storage devices. Examples of client electronic devices 38, 40, 42, 44 may include, but are not limited to, personal computer 38, laptop computer 40, personal digital assistant 42, notebook computer 44, a server (not shown), a data-enabled, cellular telephone (not shown), and a dedicated network device (not shown).

Users 46, 48, 50, 52 may access storage network 12 directly through network 14 or through secondary network 18. Further, storage network 12 may be connected to network 14 through secondary network 18, as illustrated with phantom link line 54.

The various client electronic devices may be directly or indirectly coupled to network 14 (or network 18). For example, personal computer 38 is shown directly coupled to network 14 via a hardwired network connection. Further, notebook computer 44 is shown directly coupled to network 18 via a hardwired network connection. Laptop computer 40 is shown wirelessly coupled to network 14 via wireless communication channel 56 established between laptop computer 40 and wireless access point (i.e., WAP) 58, which is shown directly coupled to network 14. WAP 58 may be, for example, an IEEE 802.11a, 802.11b, 802.11g, Wi-Fi, and/or Bluetooth device that is capable of establishing wireless communication channel 56 between laptop computer 40 and WAP 58. Personal digital assistant 42 is shown wirelessly coupled to network 14 via wireless communication channel 60 established between personal digital assistant 42 and cellular network/bridge 62, which is shown directly coupled to network 14.

As is known in the art, all of the IEEE 802.11x specifications may use Ethernet protocol and carrier sense multiple access with collision avoidance (i.e., CSMA/CA) for path sharing. The various 802.11x specifications may use phase-shift keying (i.e., PSK) modulation or complementary code keying (i.e., CCK) modulation, for example. As is known in the art, Bluetooth is a telecommunications industry specification that allows e.g., mobile phones, computers, and personal digital assistants to be interconnected using a short-range wireless connection.

Client electronic devices 38, 40, 42, 44 may each execute an operating system, examples of which may include but are not limited to Microsoft Windows™, Microsoft Windows CE™, Redhat Linux™, or a custom operating system.

The Data Mirroring Process:

For the following discussion, client application 22 is going to be described for illustrative purposes. However, this is not intended to be a limitation of this disclosure, as other client applications (e.g., client applications 24, 26, 28) may be equally utilized.

Figure 2:
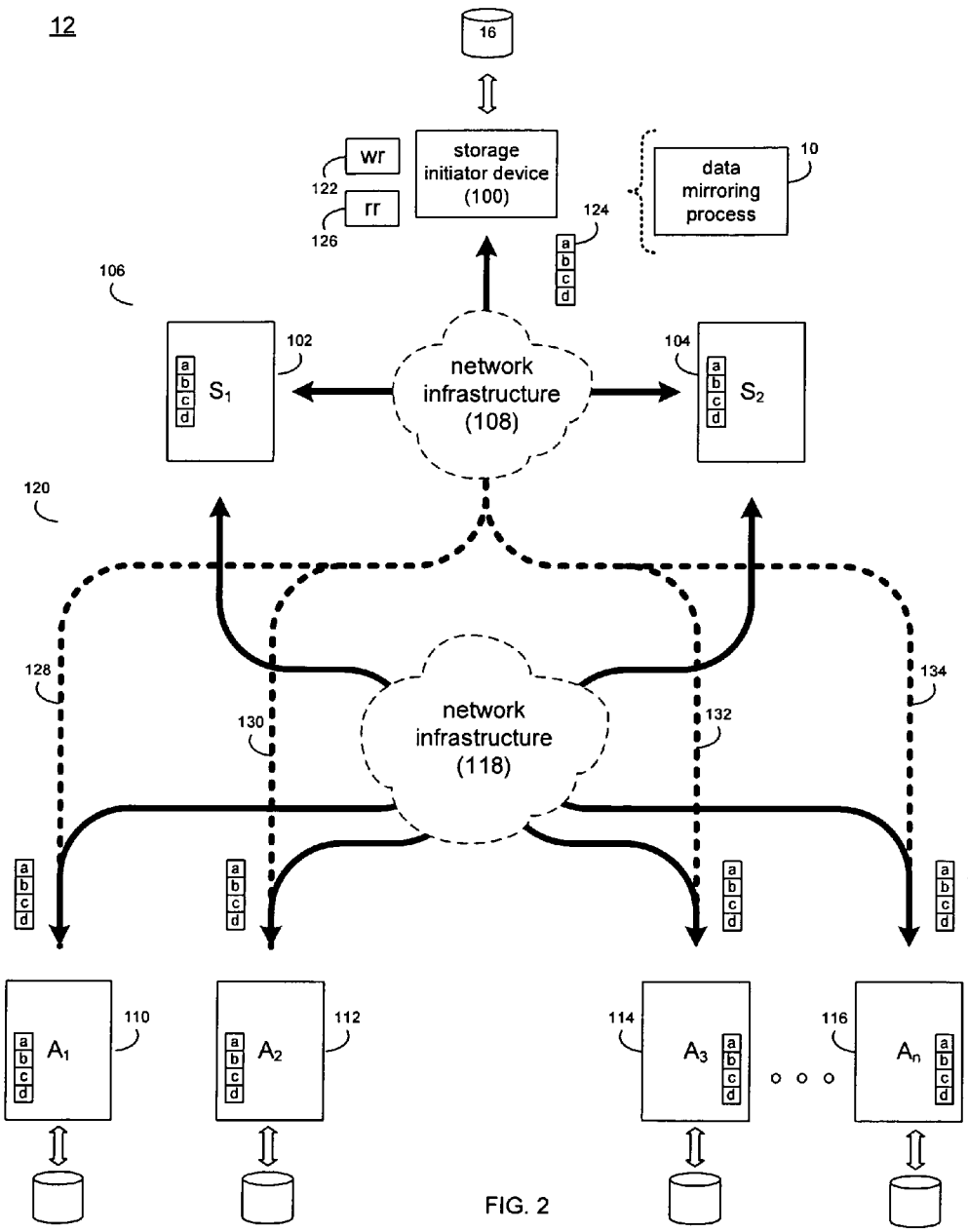
FIG. 2 is a diagrammatic view of the storage network of FIG. 1.

Referring also to FIG. 2, storage network 12 may include a storage initiator device (e.g. storage initiator device 100) and a plurality of synchronous storage targets $S_1$ and $S_2$ (e.g. synchronous storage targets 102, 104). Storage initiator device 100 and synchronous storage targets 102, 104 may be configured as a synchronously-mirrored storage group (e.g. synchronously-mirrored storage group 106). While in this particular example, storage network 12 generally (and synchronously-mirrored storage group 106 specifically) are shown to include two synchronous storage targets (e.g. synchronous storage targets 102, 104), this is for illustrative purposes only and is not intended to be a limitation of this disclosure. Specifically, the actual number of synchronous storage targets may be increased or decreased depending upon e.g. the level of redundancy required.

The various devices (e.g., storage initiator device 100 and synchronous storage targets 102, 104) included within synchronously-mirrored storage group 106 may be coupled together using a network infrastructure (e.g. network infrastructure 108). Examples of network infrastructure 108 may include but are not limited to a fiber channel network infrastructure and an IP (i.e., internet protocol) network infrastructure.

Storage network 12 may further include a plurality of asynchronous storage targets $A_{1-n}$ (e.g. asynchronous storage targets 110, 112, 114, 116). While in this particular example, storage network 12 is shown to include four asynchronous storage targets (e.g. asynchronous storage targets 110, 112, 114, 116), this is for illustrative purposes only and is not intended to be a limitation of this disclosure. Specifically, the actual number of asynchronous storage targets may be increased or decreased depending upon e.g. the level of redundancy required.

Asynchronous storage targets 110, 112, 114, 116 may be coupled together using a network infrastructure (e.g. network infrastructure 118). Examples of network infrastructure 118 may include but are not limited to an IP (i.e., internet protocol) network infrastructure.

The manner in which storage network 12 is implemented may vary depending upon e.g. the level of redundancy required. For example, storage network 12 may be a RAID array in which storage initiator device 100 is a RAID controller card and synchronous storage targets 102, 104, and asynchronous storage targets 110, 112, 114, 116 are individual "hot-swappable" hard disk drives. An example of such a RAID array may include but is not limited to an NAS device. Alternatively, storage network 12 may be configured as a SAN, in which storage initiator device 100 may be e.g., a server computer and each of synchronous storage targets 102, 104, and asynchronous storage targets 110, 112, 114, 116 may be a RAID array and/or computer-based hard disk drive. Further still, one or more of synchronous storage targets 102, 104, and asynchronous storage targets 110, 112, 114, 116 may be a SAN.

In the event that storage network 12 is configured as a SAN, network infrastructure 108 and/or network infrastructure 118 may be configured as a Layer 2 network or a Layer 3 network.

As is known in the art, the data link layer is Layer 2 of the seven-layer OSI model as well as the five-layer TCP/IP model. Layer 2 may respond to service requests from the network layer and may issue service requests to the physical layer. Within a Layer 2 network, devices (e.g. storage initiator device 100, synchronous storage targets 102, 104, and asynchronous storage targets 110, 112, 114, 116) may be addressed using MAC (i.e., Media Access Control) addresses. Accordingly, if network infrastructure 108 and/or network infrastructure 118 are configured as a Layer 2 network infrastructure, one or more of storage initiator device 100, synchronous storage targets 102, 104, and asynchronous storage targets 110, 112, 114, 116 may each have a unique MAC address.

Further and as is known in the art, the network layer is Layer 3 of the seven-layer OSI model as well as the five-layer TCP/IP model. Layer 3 may respond to service requests from the transport layer and may issue service requests to the data link layer. In the TCP/IP model, Layer 3 may be referred to as the Internet layer. Within a Layer 3 network, devices (e.g. storage initiator device 100, synchronous storage targets 102, 104, and asynchronous storage targets 110, 112, 114, 116) may be addressed using IP (i.e., Internet Protocol) addresses. Accordingly, if network infrastructure 108 and/or network infrastructure 118 are configured as a Layer 3 network infrastructure, each of storage initiator device 100, synchronous storage targets 102, 104, and asynchronous storage targets 110, 112, 114, 116 may each have a unique IP address.

Generally, the network layer (i.e., Layer 3) may be responsible for end-to-end (e.g., source to destination) data delivery, whereas the data link layer (i.e., Layer 2) may be responsible for node-to-node (e.g., hop to hop) data delivery.

Storage initiator device 100 may execute all or a portion of data mirroring process 10. Additionally, one or more of synchronous storage targets 102, 104, and asynchronous storage targets 110, 112, 114, 116 may execute all or a portion of data mirroring process 10. For example, data mirroring process 10 may be a multi-component process that includes e.g., an initiator-based component (not shown) and a target-based component (not shown). For example and for illustrative purposes, the initiator-based component of data mirroring process 10 may be executed on storage initiator device 100. Further and for illustrative purposes, the target-based component of data mirroring process 10 may be executed on each of storage targets 110, 112, 114, 116. Accordingly, the initiator-based component of data mirroring process 10 and the target-based component(s) of data mirroring process 10 may cooperatively operate to effectuate all of the functionality of data mirroring process 10.

The instruction sets and subroutines of the initiator-based component of data mirroring process 10, which may be stored on a storage device (e.g., storage device 16) coupled to storage initiator device 100, may be executed by one or more processors (not shown) and one or more memory architectures (not shown) included within storage initiator device 100. Storage device 16 may include but is not limited to: a hard disk drive; a tape drive; an optical drive; a RAID array; a random access memory (RAM); and a read-only memory (ROM).

The instruction sets and subroutines of the target-based component of data mirroring process 10, which may be stored on a storage device (not shown) coupled to e.g., each of storage targets 110, 112, 114, 116, may be executed by one or more processors (not shown) and one or more memory architectures (not shown) included within each of storage targets 110, 112, 114, 116. The storage device (not shown) may include but is not limited to: a hard disk drive; a tape drive; an optical drive; a RAID array; a random access memory (RAM); and a read-only memory (ROM).

Referring also to FIG. 3, data mirroring process 10 may utilize multicasting to distribute data requests between various devices (e.g. synchronous storage target 102, synchronous storage target 104 (i.e. in the event of synchronous storage target 102 being unavailable), and asynchronous storage targets 110, 112, 114, 116) included within storage network 12. Accordingly, data mirroring process 10 may define 150 a multicast group (e.g. multicast group 120) within network infrastructure 118, such that any message multicast by any device included within multicast group 120 may be received by any other device included within multicast group 120. When defining 150 multicast group 120, the manner in which the multicast group is defined may vary depending on the type of network infrastructure (e.g. Layer 2 or Layer 3). For example, when data mirroring process 10 is defining 150 a multicast group within a Layer 2 network infrastructure, data mirroring process 10 may define 152 multicast group 120 as a plurality of MAC addresses to be addressable as a whole by a single multicast IP address. Alternatively, when data mirroring process 10 is defining 150 a multicast group within a Layer 3 infrastructure, data mirroring process 10 may define 154 multicast group 120 as a plurality of IP addresses to be addressable as a whole by a single multicast IP address.

As discussed above, various data requests (e.g. data request 20) may be sent from client applications 22, 24, 26, 28 to storage network 12, and examples of data request 20 may include but are not limited to data write requests (i.e. a request that a data segment be written to storage network 12) and data read requests (i.e. a request that a data segment be read from storage network 12).

Upon storage initiator device 100 receiving 156 a write request (e.g. write request 122) for storing a data segment (e.g. data segment 124) within multicast group 120, data mirroring process 10 may provide data segment 124 to synchronous storage target 102. When providing data segment 124 to synchronous storage target 102, data mirroring process 10 may use a point-to-point transmission methodology. Upon receiving data segment 124 from storage initiator device 100, synchronous storage target 102 may provide a copy of data segment 124 to synchronous storage target 104 (via network infrastructure 108). Again, when providing data target 124 to synchronous storage target 104, data mirroring process 10 may use a point-to-point transmission methodology. Upon receiving data segment 124 from synchronous storage target 102, data mirroring process 10 may store a copy of data segment 124 on synchronous storage target 104.

Upon synchronous storage target 104 successfully storing a copy of data segment 124 on synchronous storage target 104, data mirroring process 10 may provide a write acknowledgment (not shown) to synchronous storage target 102 (via network infrastructure 108) acknowledging that data segment 124 was successfully stored on synchronous storage target 124. Assuming that data segment 124 was also successfully stored on synchronous storage target 102, upon synchronous storage target 102 receiving the write acknowledgment (not shown) from synchronous storage target 104, data mirroring process 10 may provide a write acknowledgment (not shown) to storage initiator device 100, acknowledging that data segment 124 was successfully stored 158 on the storage targets (e.g. synchronous storage target 102 and synchronous storage target 104) included within synchronously-mirrored storage group 106.

As discussed above, data mirroring process 10 may utilize multicasting to distribute data requests between various devices (e.g. synchronous storage target 102, synchronous storage target 104 (i.e. in the event of synchronous storage target 102 being unavailable), and asynchronous storage targets 110, 112, 114, 116) included within storage network 12. Accordingly, upon synchronous storage target 102 receiving data segment 124 from storage initiator device 100, data mirroring process 10 may multicast 160 data segment 124 to the asynchronous storage targets (e.g. asynchronous storage targets 110, 112, 114, 116) included within multicast group 120. When multicasting 160 data segment 124 to each of asynchronous storage targets 110, 112, 114, 116, data mirroring process 10 may provide data segment 124 in its entirety to the asynchronous storage targets. For illustrative purposes, assume that data segment 124 is an eight-kilobyte data segment that includes four two-kilobyte data chunks, namely data chunk "a", data chunk "b", data chunk "c", and data chunk "d". Accordingly, when multicasting 160 data segment 124 to each of asynchronous storage targets 110, 112, 114, 116, data mirroring process 10 may multicast 160 the entire eight-kilobyte data segment (including data chunk "a", data chunk "b", data chunk "c", and data chunk "d").

Upon receiving data segment 124, which was multicast 160 by (in this example) synchronous storage target 102, data mirroring process 10 may store 162 data segment 124 on each of the plurality of asynchronous storage targets (e.g. asynchronous storage targets 110, 112, 114, 116). Accordingly, on each of asynchronous storage targets 110, 112, 114, 116, an identical copy of data segment 124 may be stored 162, thus providing an increased level of data redundancy.

Upon receiving and/or storing 162 data segment 124, the asynchronous storage target receiving and/or storing 162 data segment 124 may transmit a positive acknowledgment to multicast group 120 (i.e. a message that announces that the subject asynchronous storage target did receive and/or store 162 data segment 124).

Conversely, in the event that the asynchronous storage target fails to receive and/or store 162 data segment 124, the asynchronous storage target in question may transmit a negative acknowledgment to multicast group 120 (i.e. a message that announces that the subject asynchronous storage target did not receive and/or store 162 data segment 124). In the event that a negative acknowledgment is transmit to multicast group 120, one or more of the asynchronous storage targets that did indeed successfully receive and/or store 162 data segment 124 may either multicast data segment 124 to multicast group 120 or may unicast data segment 124 to the specific asynchronous storage target that transmit the negative acknowledgment (i.e., the asynchronous storage target that did not receive the multicast data segment).

Unlike synchronous storage targets (e.g. synchronous storage targets 102, 104 included within synchronously-mirrored storage group 106), data (e.g., data segment 124) that is provided to asynchronous storage targets (e.g. asynchronous storage targets 110, 112, 114, 116) may not promptly be stored on the asynchronous storage target. Specifically, while it is possible for a data segment (e.g. data segment 124) to be promptly written to one or more of the asynchronous storage targets, it is possible for considerable delays (e.g. in excess of an hour) to be experienced between the time that e.g. data segment 124 is provided to an asynchronous storage target and the time that e.g. data segment 124 is actually written to the asynchronous storage target. Accordingly, during use, the asynchronous storage targets (e.g. asynchronous storage targets 110, 112, 114, 116) included within storage network 12 may not actually be as up-to-date as the data stored on the synchronous storage targets (e.g. synchronous storage targets 102, 104) included within storage network 12.

Referring also to FIG. 4, upon storage initiator device 100 receiving 164 a read request (e.g. read request 126) for reading a data segment (e.g. data segment 124) included within synchronously-mirrored storage group 106 of storage network 12, data mirroring process 10 may retrieve 166 data segment 124 from one or more of synchronous storage targets 102, 104. Typically, data segment 124 may be retrieved from the primary synchronous storage target. Assume for illustrative purposes that (in this particular example) synchronous storage target 102 is the primary synchronous storage target within synchronously-mirrored storage group 106. Accordingly, upon storage initiator device 100 receiving 164 read request 126, data mirroring process 10 may obtain data segment 124 from synchronous storage target 102.

Once data segment 124 is received on storage initiator device 100, data mirroring process 10 may transmit data segment 124 to the client electronic device (e.g., personal computer 38, laptop computer 40, personal digital assistant 42, and notebook computer 44) that requested data segment 124.

Periodically, data mirroring process 10 may examine synchronously-mirrored storage group 106 to determine the "health" (i.e. condition) of synchronously-mirrored storage group 106. For example, data mirroring process 10 may confirm that all synchronous storage targets (e.g. synchronous storage target 102 and synchronous storage target 104) are "available". For example, one or more of synchronous storage targets 102, 104 may emit a "heartbeat" signal that the other synchronous storage target (and/or storage initiator device 100) monitors. In the event that a "heartbeat" signal is not "heard" from a particular synchronous storage target, data mirroring process 10 may define that particular synchronous storage target as being "unavailable". The frequency at which data mirroring process 10 examines the "health" of synchronously-mirrored storage group 106 may vary depending upon the particular implementation of storage network 12. For example, data mirroring process 10 may be configured to determine the "health" of synchronously-mirrored storage group 106 whenever a read request (e.g. read request 126) is received, a write request (e.g. write request 122) is received, at a defined chronological interval (e.g., every ten minutes), or continuously.

If 168 data mirroring process 10 determines that one of the synchronous storage targets (e.g. synchronous storage target 102 or synchronous storage target 104) is "unavailable", data mirroring process 10 may synchronize 170 the available synchronous storage target with a selected asynchronous storage target chosen from the one or more asynchronous storage targets. For example, assume for illustrative purposes that synchronous storage target 104 is a RAID array in which an internal power supply has failed. Accordingly, synchronous storage target 104 will be unavailable. As discussed above, one or more of storage initiator device 100 and synchronous storage target 102 may monitor network infrastructure 108 for the presence of the "heartbeat" signal emitted by synchronous storage target 104. In the event that such a "heartbeat" signal is not heard from synchronous storage target 104, data mirroring process 10 may determine 168 that synchronous storage target 104 is unavailable. Accordingly, data mirroring process 10 may synchronize 170 synchronous storage target 102 (i.e., the "available" synchronous storage target) with a selected asynchronous storage target chosen from the one or more asynchronous storage targets (e.g. asynchronous storage targets 110, 112, 114, 116).

Data mirroring process 10 may examine the various asynchronous storage targets included within multicast group 120 to determine which of the asynchronous storage target should be synchronized 170 with synchronous storage target 102. For example, data mirroring process 10 may select the quickest asynchronous storage target (e.g. the asynchronous storage target that has the quickest access time and/or the highest data throughput level). Alternatively, data mirroring process 10 may examine the asynchronous storage targets included within multicast group 120 to determine which of the asynchronous storage targets is the most up to date. As discussed above, the asynchronous storage targets (e.g. asynchronous storage targets 110, 112, 114, 116) included within storage network 12 may actually be not as up-to-date as the data stored on the synchronous storage targets (e.g. synchronous storage targets 102, 104) included within storage network 12. Accordingly, data mirroring process 10 may determine which of asynchronous storage targets 110, 112, 114, 116 is the most up-to-date (with respect to e.g. "available" synchronous storage target 102) and may choose to synchronize "available" synchronous storage target 102 with the most up-to-date asynchronous storage target.

Once data mirroring process 10 selects the appropriate asynchronous storage target, data mirroring process 10 may compare the data stored within "available" synchronous storage target 102 to the data stored within the selected synchronous storage target. Assume for illustrative purposes that asynchronous storage target 110 is selected by data mirroring process 10 for synchronization 170. Accordingly, data mirroring process 10 may employ a comparison process to determine which pieces of data (e.g. which data segments) are missing from asynchronous storage target 110. In the event the data mirroring process 10 determines that one or more data segments are present on "available" synchronous storage target 102 but missing from asynchronous storage target 110, data mirroring process 10 may copy (via one or more of network infrastructures 108, 118) the missing data segments from "available" synchronous data target 102 to asynchronous data target 110.

Once synchronized 170, data mirroring process 10 may promote 172 the selected asynchronous storage target (e.g. asynchronous storage target 110) to synchronously-mirrored storage group 106, thus allowing "promoted" asynchronous storage target 110 to fill the role of "unavailable" synchronous storage target 104.

While network infrastructure 118 is shown to couple synchronous storage targets 102, 104 and asynchronous storage targets 110, 112, 114, 116, network infrastructure 108 may also be configured to couple the available synchronous storage target (e.g. synchronous storage target 102) with the asynchronous storage target (e.g. asynchronous storage target 110) that was promoted 172 from an asynchronous storage target to a synchronous storage target. For example, network infrastructure 108 is shown to include four network links 128, 130, 132, 134 (shown in phantom) that allow for communication between the available synchronous storage target and the promoted a synchronous storage target.

Through the use of data mirroring process 10, a plurality of asynchronous storage targets (e.g. asynchronous storage targets 110, 112, 114, 116) may be configured as "hot spares" for storage network 12, thus allowing data mirroring process 10 to automatically repair synchronously-mirrored storage group 106 (i.e. in the event of a synchronous storage target failure) by synchronizing 170 the available synchronized storage target with one of the "hot spare" asynchronous storage targets and promoting 172 the now-synchronized "hot spare" asynchronous storage target to a synchronous storage target, which may replace the failed synchronous storage target.

A number of implementations have been described. Nevertheless, it will be understood that various modifications may be made. Accordingly, other implementations are within the scope of the following claims.

What is claimed is:

1. A multicast data mirroring method comprising:
   defining a multicast group within a local area network, wherein:
      the multicast group includes a first synchronous storage target and one or more asynchronous storage targets, and
      the synchronous storage target is a member of a synchronously-mirrored storage group including at least a second synchronous storage target and a storage initiator device, wherein the first synchronous storage target and the second synchronous storage target emit a periodic heartbeat signal; and
   in response to determining that the first synchronous storage target or the at least a second synchronous storage target is unavailable based upon, at least in part, the heartbeat signal, synchronizing the available synchronous storage target with a selected asynchronous storage target chosen from the one or more asynchronous storage targets;
   wherein the selected asynchronous storage target includes a most up to date data segment relative to the available synchronous storage target.

2. The multicast data mirroring method of claim 1 wherein defining the multicast group includes defining a group of IP addresses to be addressable as a whole by a single multicast IP address.

3. The multicast data mirroring method of claim 1 wherein at least one of the plurality of storage targets is chosen from the group consisting of: a hard drive; a RAID array of hard drives; a computing device including one or more hard drives; and a Storage Area Network.

4. The multicast data mirroring method of claim 1 further comprising:
   receiving, on the storage initiator device, a read request for reading a data segment from the synchronously-mirrored storage group; and
   retrieving the data segment from one or more of the synchronous storage targets.

5. The multicast data mirroring method of claim 1 further comprising:
   promoting the selected asynchronous storage target to the synchronously-mirrored storage group.

6. The multicast data mirroring method of claim 1 wherein:
   the first synchronous storage target, the at least a second synchronous storage target and the storage initiator device are coupled using a first network infrastructure; and
   the first synchronous storage target and the one or more asynchronous storage targets are coupled using a second network infrastructure.

7. The multicast data mirroring method of claim 1 wherein the selected asynchronous storage target includes having a quickest access time.

8. The multicast data mirroring method of claim 1 wherein the selected asynchronous storage target includes having a highest data throughput level.

9. A computer program product residing on a non-transitory computer readable medium having a plurality of instructions stored thereon which, when executed by a processor, cause the processor to perform operations comprising:
   defining a multicast group within a local area network, wherein:
      the multicast group includes a first synchronous storage target and one or more asynchronous storage targets, and
      the synchronous storage target is a member of a synchronously-mirrored storage group including at least a second synchronous storage target and a storage initiator device, wherein the first synchronous storage target and the second synchronous storage target emit a periodic heartbeat signal; and
   in response to determining that the first synchronous storage target or the at least a second synchronous storage target is unavailable based upon, at least in part, the heartbeat signal, synchronizing the available synchronous storage target with a selected asynchronous storage target chosen from the one or more asynchronous storage targets;
   wherein the selected asynchronous storage target includes a most up to date data segment relative to the available synchronous storage target.

10. The computer program product of claim 9 wherein the instructions for defining the multicast group include instructions for defining a group of IP addresses to be addressable as a whole by a single multicast IP address.

11. The computer program product of claim 9 wherein at least one of the plurality of storage targets is chosen from the group consisting of: a hard drive; a RAID array of hard drives; a computing device including one or more hard drives; and a Storage Area Network.

12. The computer program product of claim 9 further comprising instructions for:
   receiving, on the storage initiator device, a read request for reading a data segment from the synchronously-mirrored storage group; and
   retrieving the data segment from one or more of the synchronous storage targets.

13. The computer program product of claim 9 further comprising instructions for:
   promoting the selected asynchronous storage target to the synchronously-mirrored storage group.

14. The computer program product of claim 9 wherein:
   the first synchronous storage target, the at least a second synchronous storage target and the storage initiator device are coupled using a first network infrastructure; and
   the first synchronous storage target and the one or more asynchronous storage targets are coupled using a second network infrastructure.

15. The computer program product of claim 9 wherein the selected asynchronous storage target includes having a quickest access time.

16. The computer program product of claim 9 wherein the selected asynchronous storage target includes having a highest data throughput level.

* * * * *